(12) United States Patent
Ylitalo

(10) Patent No.: US 9,814,246 B1
(45) Date of Patent: Nov. 14, 2017

(54) FISH FILLETING MAT

(71) Applicant: Peter M Ylitalo, Deer Park, WA (US)

(72) Inventor: Peter M Ylitalo, Deer Park, WA (US)

( * ) Notice: Subject to any disclaimer, the term of this patent is extended or adjusted under 35 U.S.C. 154(b) by 0 days.

(21) Appl. No.: 15/252,300

(22) Filed: Aug. 31, 2016

(51) Int. Cl.
    *A22C 25/00*     (2006.01)
    *A22C 17/00*     (2006.01)
    *A22C 25/06*     (2006.01)

(52) U.S. Cl.
    CPC .......... *A22C 17/0013* (2013.01); *A22C 25/06* (2013.01)

(58) Field of Classification Search
    CPC .. A22C 17/00; A22C 17/0006; A22C 17/0013
    USPC ................................ 452/1, 11, 185, 194, 198
    See application file for complete search history.

(56) References Cited

U.S. PATENT DOCUMENTS

| | | | | | |
|---|---|---|---|---|---|
| 3,713,188 | A | * | 1/1973 | Holladay | A22C 25/06 452/196 |
| 3,877,144 | A | * | 4/1975 | LeBlanc | A01K 97/00 269/16 |
| 6,123,615 | A | * | 9/2000 | Reber | A22C 25/025 452/161 |
| 6,942,562 | B2 | * | 9/2005 | Kallas | A22C 25/06 452/195 |
| 7,390,249 | B2 | * | 6/2008 | Sorey | A22C 25/025 452/195 |
| 7,574,163 | B2 | * | 8/2009 | Sato | G03G 15/0868 399/260 |
| 8,376,816 | B2 | * | 2/2013 | Redford | A22C 25/06 452/195 |
| 8,574,043 | B2 | * | 11/2013 | Zean | A22C 9/008 452/144 |
| 8,870,637 | B1 | * | 10/2014 | Leuallen | A22C 25/06 452/195 |

* cited by examiner

*Primary Examiner* — Richard Price, Jr.
(74) *Attorney, Agent, or Firm* — Timberline Patent Law Group PLLC; Mark Farrell

(57) ABSTRACT

A fish filleting mat is provided. In an implementation, an example fish filleting mat has a pattern of pegs on a working surface to grip and immobilize the fish during cleaning and filleting. The pegs hold the fish and also the byproducts of cleaning and filleting in place during cleaning and filleting, even when the fish filleting mat is tilted to drain liquids. The fish filleting mat, including pegs, may be made of materials that are easy to clean and stain-resistant, and which do not retain fish odors.

11 Claims, 4 Drawing Sheets

FISH FILLETING MAT

BACKGROUND

Cutting boards and mats for cleaning fish and cutting the fish to make filets are often slippery. Attempts to make the working surface non-slippery often result in rendering the working surface difficult to clean. A smooth surface on a conventional cutting board or mat allows the fish to slide, and since the fish is also slippery to the human hand, it is easy to lose control of the fish. This can result in injury if the fish is being cut with a sharp instrument for cleaning or filleting. Conventional attempts to make the surface non-slip, such as adding texture, sandpaper, or astroturf to the surface also render the surface difficult to clean and apt to retain fish odors.

DETAILED DESCRIPTION

Overview

This disclosure describes example fish filleting mats. In an implementation, an example fish filleting mat has a pattern of pegs on a working surface to grip and immobilize the fish during cleaning and filleting. The pegs hold the fish and also the byproducts of cleaning and filleting in place during cleaning and filleting, even when the fish filleting mat is tilted to drain liquids. The fish filleting mat, including pegs, may be made of materials that are easy to clean and stain-resistant, and which do not retain fish odors.

Figure 1:
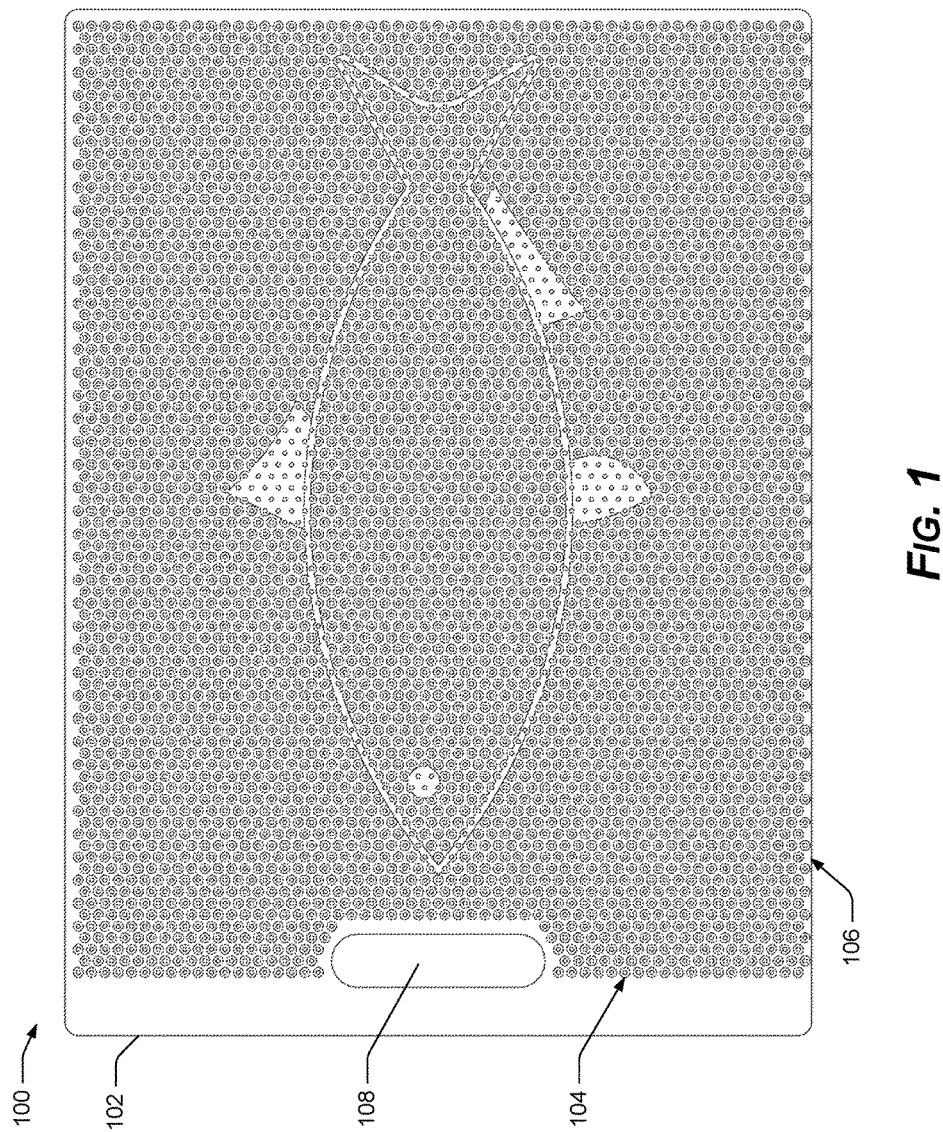
FIG. 1 is a diagram of an example fish filleting mat.

FIG. 1 shows an example implementation of the fish filleting mat 100. A board 102 or mat is composed of a rigid member or semi-flexible member. A pattern of projections ("pegs") 104 arise from the board 102 or mat, providing a mechanism for gripping fish to be cleaned or filleted. The pegs 104 can be disposed in a periodic pattern on the surface of the board or mat 100. For example rows of the pegs 104 can be arranged along lines or diagonals, and neighboring or adjacent pegs 104 in different rows can form squares, rectangles, triangles, circles, hexagons, and so forth, with respect to each other.

The fish filleting mat 100 may be constructed in various sizes for different ranges of fish sizes. The pattern of projections 104 grips an outside surface of a fish, which may be slippery when wet, or even when dry. The pattern of projections or pegs 104 also immobilizes the interior parts of the fish during cleaning, and can keep all the byproducts of fish cleaning from falling off the fish filleting mat 100, except perhaps liquids. In an implementation, an optional outer edge 106 around the circumference of the fish filleting mat 100 is raised in order to also contain liquids as the fish is cleaned or filleted. A handle 108 may also be provided in an implementation of the fish filleting mat 100, for carrying.

Figure 2:
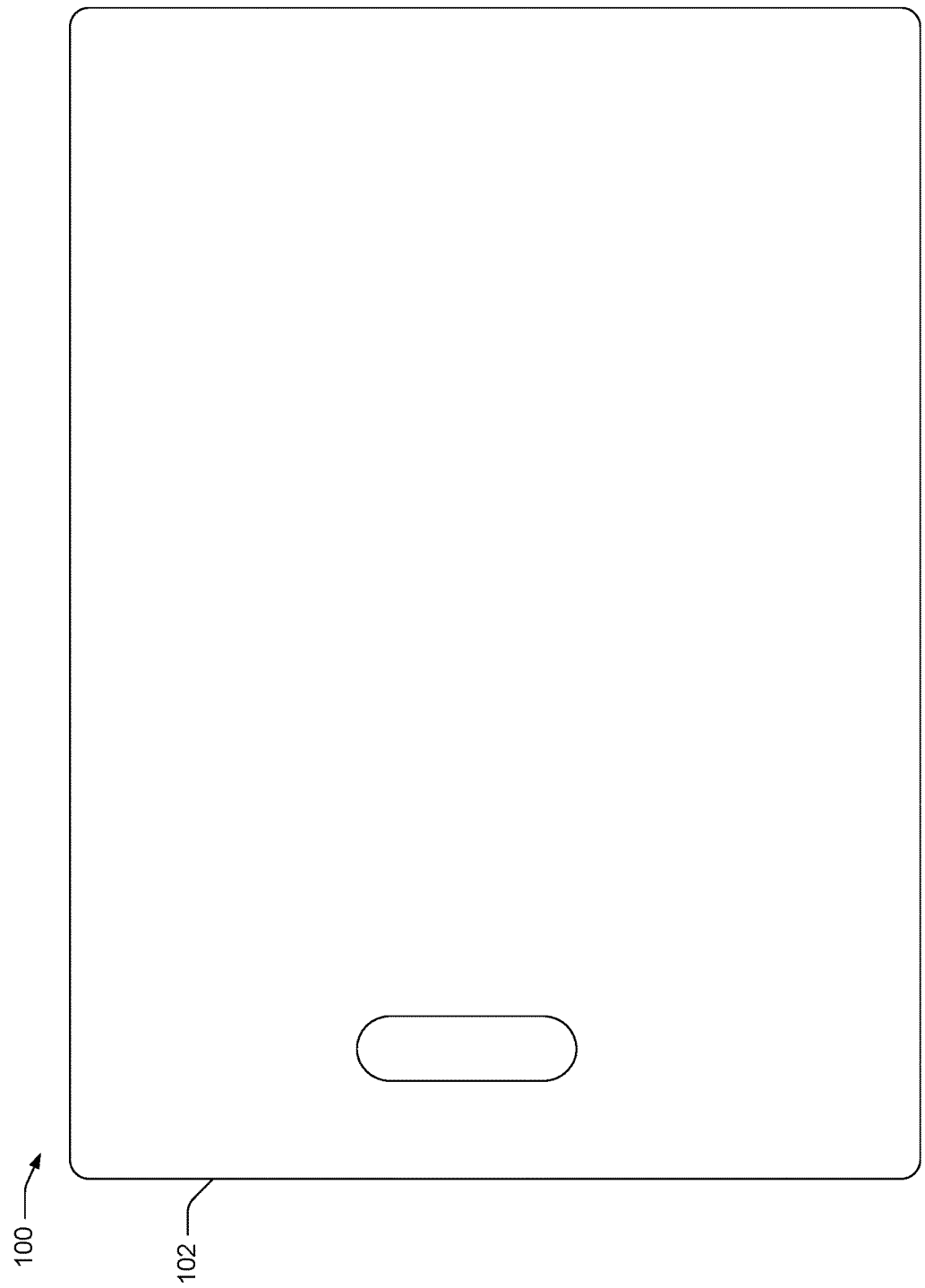
FIG. 2 is a diagram of a bottom surface of the example fish filleting mat.

FIG. 2 shows a bottom surface of the example fish filleting mat 100, which can be smooth and hard in the same manner as a cutting board. Depending on material used to construct the fish filleting mat 100, the board 102 or mat may have a degree of flex, but is substantially rigid or semi-rigid.

The example fish filleting mat 100, including the board 102 or mat and the raised projections or pegs 104, can be composed of various materials, such as a rigid or semi-rigid elastomer, a thermoplastic vulcanizate (TPV), an ethylene propylene diene monomer (EPDM) rubber, a nylon, or a high density polyethylene (HDPE), for example, or more generally may be constructed of a plastic, a rubber, or a wood. The raised projections, or pegs 104, can be pointed members, pins, tacks, nails, spikes, studs, and so forth, collectively called "pegs" 104 herein. The pegs 104 may be composed of a stain-resistant material, and/or an odor-resistant material, as above.

Figure 3:
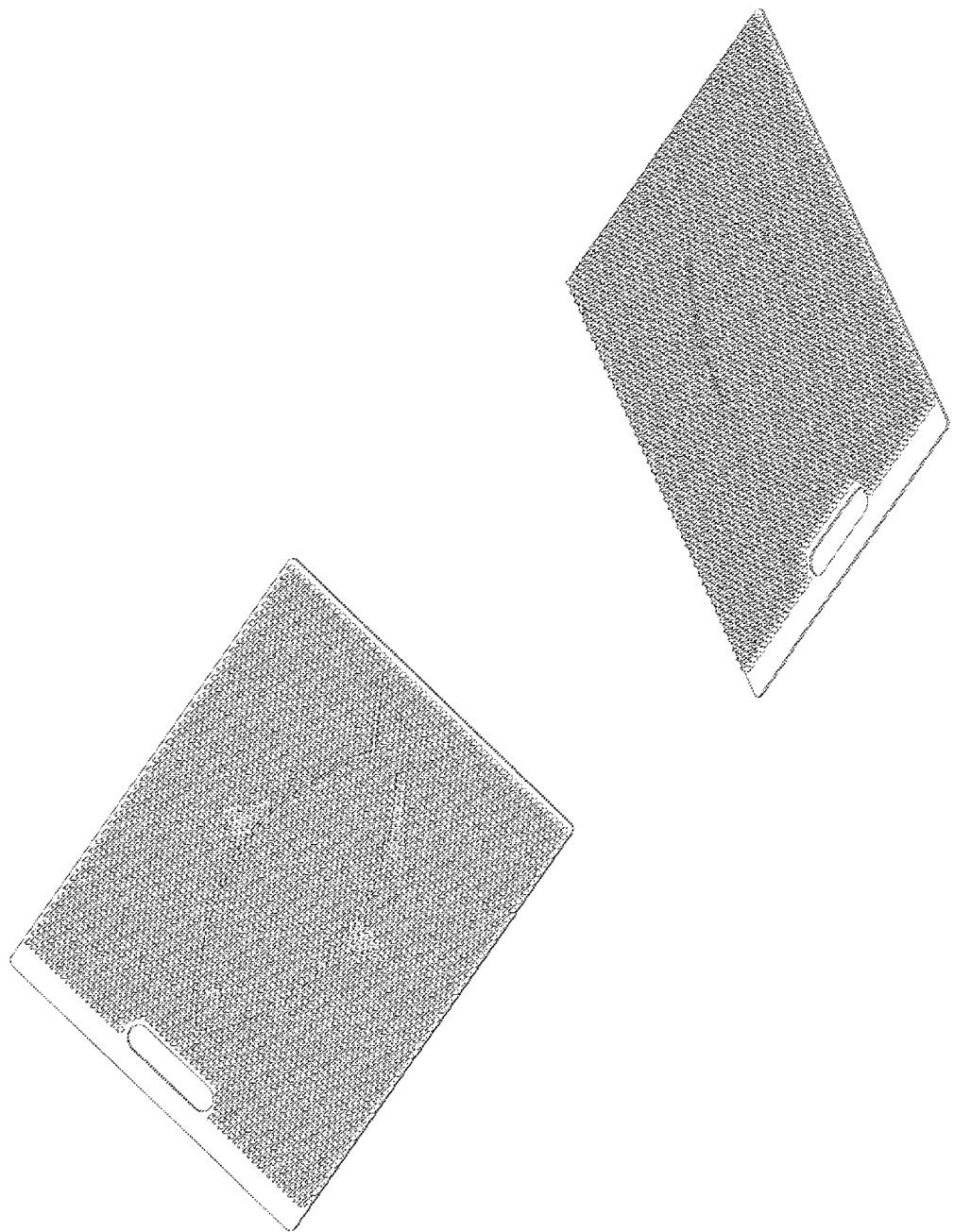
FIG. 3 is a diagram of the example fish filleting mat at different elevations or tilts.

FIG. 3 shows views of the example fish filleting mat 100 at various elevations or tilts. The fish filleting mat 100 can be tilted to a certain degree to drain liquids, while still firmly gripping the fish and byproducts from sliding off the fish filleting mat 100. The liquids to be drained while cleaning or filleting may include fresh water being sprayed on the fish and the fish filleting mat 100 during the cleaning or the filleting.

Figure 4:
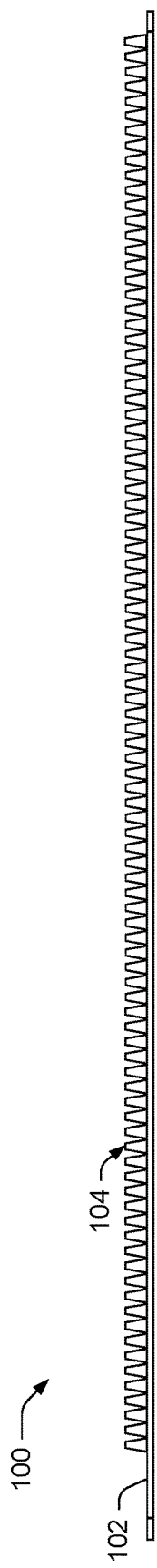
FIG. 4 is a side view of the example fish filleting mat along a length dimension of the fish filleting mat.

FIG. 4 shows a side view of an example fish filleting mat 100, along a length dimension of the example fish filleting mat 100. The pattern of projections, or pegs 104, rises from the board 102 or mat. Each peg 104 may be wider at its base at its connection to the board 102 or mat, and then may narrow or taper to a top, or point, that grips the fish, furthest away from the board 102 or mat.

The pegs 104 may be composed, for example, of pyramidal, pin-like, or peg-like protrusions from the board 102 or mat, tapering from the wider base at the mat or board surface to a narrower top, the taper between the wider base and the narrower top comprising approximately a 7-15 degree angle or deviation from a vertical perpendicular, with respect to the horizontal plane of the board 102 or mat.

In an implementation, the pegs 104 have a height between approximately ⅜ inch and approximately ⅝ inch. The pegs 104 may be between ⅜ inch and ¼ inch apart from each other, for example.

In another implementation, the pegs 104 may have a height between approximately ½ inch and approximately 1 inch, and the pegs 104 may be between approximately ⅝ inch and approximately 1 inch apart from each other.

Figure 5:
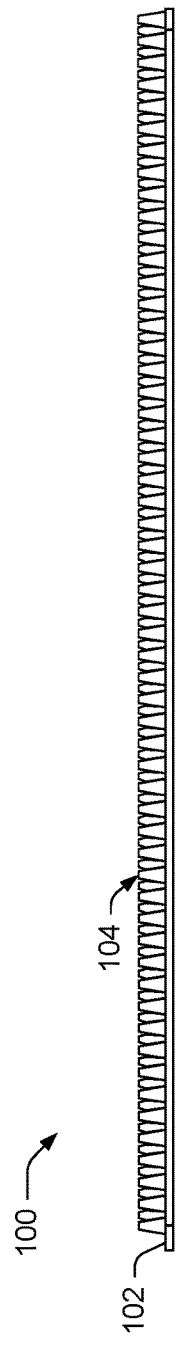
FIG. 5 is a side view of the example fish filleting mat along a width dimension of the fish filleting mat.

FIG. 5 shows a side view of an example fish filleting mat 100, along a width dimension of the example fish filleting mat 100. Depending on the pattern of projections or pegs 104, more than one row of the pegs 104 may be visible from a side view, when the pegs 104 in a second row are offset from the pegs 104 in a first row, and thereby visible between the spaces in the pegs 104 in the first row.

CONCLUSION

Although only a few example embodiments have been described in detail above, those skilled in the art will readily appreciate that many modifications are possible in the example embodiments without materially departing from the subject matter. Accordingly, all such modifications are intended to be included within the scope of this disclosure as defined in the following claims.

The invention claimed is:

1. A apparatus, comprising:

a mat or a board for cleaning or filleting a fish;

pegs built onto the mat or the board for gripping the fish during the cleaning or the filleting, wherein the pegs comprise pyramidal protrusions from the mat or the board;

wherein the pyramidal protrusions hold the fish off the mat or off the board;

wherein only the tops of the pyramidal protrusions contact the fish during the cleaning, during the filleting, or when the mat or the board is tilted to drain a liquid; and wherein the mat or the board and the pegs comprise an oil-nonabsorbant and fish-odor resistant polymer material.

2. The apparatus of claim 1, wherein the pegs comprise a periodic pattern of pegs on the surface of the mat or board.

3. The apparatus of claim 1, wherein the mat or board, and the pegs, are flexible or semi-flexible.

4. The apparatus of claim 1, wherein the mat or board, and the pegs, are composed of a material selected from the group consisting of a rubber, a plastic, an elastomer, a thermoplastic vulcanizate (TPV), an ethylene propylene diene monomer (EPDM) rubber, a nylon, a high density polyethylene (HDPE) plastic, and a wood.

5. The apparatus of claim 1, wherein the pegs comprise pyramidal protrusions from the mat or board, tapering from a wider base at the mat or board to a narrower top, the taper between the wider base and the narrower top comprising approximately a 7-15 degree deviation from a perpendicular with respect to a horizontal surface of the mat or board.

6. The apparatus of claim 1, wherein the pegs have a height of approximately between 3/8 inch and 5/8 inch.

7. The apparatus of claim 1, wherein the pegs are approximately between 3/8 inch and 1/4 inch apart from each other.

8. The apparatus of claim 1, wherein the pegs have a height approximately between 1/2 inch and 1 inch, and the pegs are approximately between 5/8 inch and 1 inch apart from each other.

9. The apparatus of claim 1, wherein the surface and the pegs are composed of a stain-resistant material.

10. The apparatus of claim 1, wherein each peg comprises a pointed top on each pyramidal protrusion to secure the fish in place when the mat or the board is tilted to drain a liquid; and wherein only the pointed tops of the pegs contact the fish during the cleaning, during the filleting, or when the mat or the board is tilted to drain a liquid.

11. The apparatus of claim 1, further comprising a raised edge around a circumference of the mat or board to contain a liquid on the mat or board.

* * * * *